United States Patent
Cananzey

(10) Patent No.: US 7,267,226 B2
(45) Date of Patent: Sep. 11, 2007

(54) CD HOLDER, PROTECTOR AND INFORMATION SYSTEM

(76) Inventor: Gary M. Cananzey, 426 Main St., Wareham, MA (US) 02571

( * ) Notice: Subject to any disclaimer, the term of this patent is extended or adjusted under 35 U.S.C. 154(b) by 687 days.

(21) Appl. No.: 10/827,575

(22) Filed: Apr. 19, 2004

(65) Prior Publication Data

US 2005/0230276 A1    Oct. 20, 2005

(51) Int. Cl.
*B65D 85/57* (2006.01)
(52) U.S. Cl. ............... 206/312; 206/308.1; 206/311
(58) Field of Classification Search ........... 206/232, 206/308.1, 311, 312; 211/41.12; 229/72
See application file for complete search history.

(56) References Cited

U.S. PATENT DOCUMENTS

| | | | | |
|---|---|---|---|---|
| 3,785,478 A | * | 1/1974 | Drori | 229/115 |
| 5,101,973 A | * | 4/1992 | Martinez | 206/308.1 |
| 5,421,453 A | * | 6/1995 | Harrer et al. | 206/312 |
| 5,460,265 A | * | 10/1995 | Kiolbasa | 206/308.1 |
| 5,472,083 A | * | 12/1995 | Robinson et al. | 206/308.1 |
| 5,749,463 A | * | 5/1998 | Collins | 206/308.1 |
| 5,901,844 A | * | 5/1999 | Gambardella et al. | 206/308.1 |
| 5,957,281 A | * | 9/1999 | Collins | 206/307.1 |
| 6,073,763 A | * | 6/2000 | Collins | 206/308.1 |
| 6,276,523 B2 | * | 8/2001 | Sanders | 206/308.1 |
| 6,360,887 B1 | * | 3/2002 | Pettey | 206/232 |
| 6,398,024 B2 | * | 6/2002 | Koehn | 206/308.1 |
| 6,615,981 B2 | * | 9/2003 | Zenta | 206/308.1 |
| 6,938,759 B2 | * | 9/2005 | Golden et al. | 206/308.3 |
| 2001/0037951 A1 | * | 11/2001 | Garnier | 206/308.1 |
| 2003/0029749 A1 | * | 2/2003 | Exline | 206/308.1 |
| 2003/0042156 A1 | * | 3/2003 | Haas | 206/312 |
| 2005/0199515 A1 | * | 9/2005 | Laarman | 206/232 |
| 2005/0199516 A1 | * | 9/2005 | Laarman | 206/232 |

* cited by examiner

*Primary Examiner*—David Fidei
(74) *Attorney, Agent, or Firm*—James F. Baird

(57) ABSTRACT

CD Holder, Protector and Information System. The system incorporates a plurality of sheets of material that are sized and shaped to form, when folded, a holder for CDs that also protects the CDs and in addition provides a plurality of surfaces on which to place printed information regarding the CD as to content, performers and other particulars. In addition the sheets may be used for artistic renderings, drawings or pictures relating to the performance that is on the CDs.

2 Claims, 4 Drawing Sheets

CD HOLDER, PROTECTOR AND INFORMATION SYSTEM

BACKGROUND

The field of my invention is CD holders, protectors and information inserts that usually accompany CDs. In the past CDs have been packaged in plastic cases, called jewel cases, or slip envelopes, that resemble the envelopes that traditional records were packaged in for protection. Both the jewel case and slip envelope act to hold and protect the CD. In either case the user must remove the CD from the packaging. In the case of the jewel case the case must be squeezed or depressed at a particular location to release the cover. This process may be awkward for the novice. At times even the experienced CD user finds the process difficult. On occasion the recorded or information surface of the CD may come into contact with the user's fingers, or some other foreign matter, causing damage to the surface and destroying some of the recorded information. Removal of a CD from a slip envelope may also be difficult with damage to the recorded surface even more likely.

Most CDs have information or descriptive notes included with the CD. The information or notes are printed on a separate page or pages that are not permanently attached to the CD. The separate page or pages may easily be lost. In addition, as time goes on, the slip envelopes may be damaged or lost. Even the jewel cases tend to be inter mixed without a clear indication as to which case belongs with which CD.

The present invention is a combined holder, protector and information system for the CD. By combining the holder, protector and information in one system the likelihood of damage is reduced. Further the information is less likely to become separated from the CD or lost.

The object of the present invention is to provide a system combining the holder, protector and information regarding the CD in one system.

The present invention provides an improved CD holder, protector and information system.

An object of the invention is to provide for one device to hold, protect and provide information regarding the CD.

A further object of the invention is to provide an improved CD holder, protector and information system that is easy and economical to make.

SUMMARY OF THE INVENTION

The invention portrayed is an improved system for holding and protecting CDs. The system also provides a plurality of surfaces for the printing of information regarding the CD. There is a need for this system as present holders and protectors for CDs are either expensive to make or unreliable in protecting the CD. The jewel cases that are used for a large percentage of the CDs marketed are more expensive to make than the present invention. Slip envelopes, that are often used as temporary holders and protectors for CDs, may be less expensive to make than the present invention. However, slip envelopes are very unreliable in acting to protect the CD as the quality of the slip envelope deteriorates with use.

The improved system of the present invention provides for a plurality of sheets that are sized and shaped to act not only as a holder for the CD but also act to protect the CD. In addition the sheets provide a plurality of areas for the display of information regarding the CD. The sheets may be used for printed information regarding the performance or performers commonly referred to as performance notes. In addition there are ample sheets for artistic renderings, drawings or pictures relating to the performance or performers.

The invention involves the use of several sheets of material in order to form a holder to protect and contain information regarding a CD. The CD would be a flat circular disk having a radius and a diameter.

The invention uses at least one base sheet, at least one cover sheet and at least one foldable panel sheet.

The base sheets would be of material that is difficult to bend such as pasteboard. The base sheets would be rectangular in shape having a height dimension, a length dimension and a thickness dimension. The base sheet height dimension would be greater than the diameter of the CD. The base sheet length dimension would be greater than the base sheet height dimension. Further the base sheet would have an outer surface, an inner surface and an edge surface.

The cover sheets would be of a material that is of a thickness that permits easy folding. The cover sheets would be used as a partial wrapper around the base sheet pasteboard. The cover sheets would have an outer surface and an inner surface. The cover sheets would be sized and shaped, when folded, in order to completely wrap the base sheets outer surface and base sheets edge surface and extend partially wrapping the base sheets inner surface. The cover sheets outer surface would be exposed when wrapped around the base sheets. The cover sheets would have information or drawings on the outer surface.

The foldable panel sheets would be of a material with a thickness that retains its shape and yet is easily folded if scored or creased at the desired fold line. The foldable panel sheets would have an outer surface, an inner surface, a center section, a top end and a bottom end. The top end and bottom end would cover the center section of the inner surface when folded. The foldable panel sheets would have information, text, drawings designs or other information printed on both the outer and inner surfaces of the top end and the bottom end, and in addition on the inner surface of the center section. The foldable panel sheets would be sized and shaped to have a width, that is less than but, nearly equal to the base sheets length and an unfolded length equal to at least twice but less than three times the base sheet height. The foldable panel sheets would have two fold lines running widthwise, one fold line being the fold line toward the top end of the foldable panel sheet and one fold line being the fold line toward the bottom end of the foldable panel sheet. The two fold lines would be spaced apart a distance that is less than the diameter of the CD. Further the foldable panel sheets would be cut with two partial arcs, one at the fold line toward the top end of the foldable panel sheet and one at the fold line toward the bottom end of the foldable panel sheet, said arcs starting and ending at the respective fold lines, with the radius of the arc being the same as the radius of the CD. With the result being that when the foldable panel sheet is folded at the two fold lines the partial arcs protrude above the respective folds. When a CD is placed upon the foldable panel prior to folding the CD is positioned with the recorded side facing downward and also to have the CDs edge match with the two partial arcs. The foldable panel sheet is then folded and the CD is held and protected.

With present concern about cost of production for items including CDs and CD packaging the present invention provides an economical unique and innovative means of holding and protecting CDs. In addition the invention eliminates extra loose documents to provide information regarding the performance and performers that are on the CD. The foregoing is another reason for the improvement provided by the present invention.

The invention portrayed is a new and improved system to hold and protect CDs, together with multiple surfaces to imprint information, text, drawings or designs regarding the performance and performers that are on the CD.

The system incorporates a plurality of options as the system may be used for a single CD or with a minimum modification for multiple CDs, a CD set or CD collection. The foldable panel sheet may be enlarged in either or both the width and length dimensions. The width could be increased to at least double, with two sections cut out at the width mid point that would permit the top end to become two separate top ends and the bottom end to become two separate bottom ends The result would be a right side foldable panel sheet and a left side foldable panel sheet joined at the center sections by a narrow strip of the panel material. This variation would permit the use of the double foldable panel sheet to hold two CDs. The most common use would include base sheets and cover sheets to form an outer protector. Further, when folded the left section could be folded over the right section forming a holder and protector for the CDs. As before the foldable panel sheet material would be available for information regarding the performance and performers. This same concept could be used to hold any number of CDs by expanding the width of the foldable panel sheet to accommodate any number of CDs. Once again base sheets and cover sheets could be used to form an outer protector. However it would be possible to eliminate the base sheets and cover sheets and use the folded over top ends and folded over bottom ends to form the outer protector.

While the invention will be discussed in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

BRIEF DESCRIPTION OF THE DRAWINGS

Turning first to FIG. 1 there is shown the present invention, CD HOLDER, PROTECTOR AND INFORMATION SYSTEM.

DESCRIPTION OF THE PREFERRED EMBODIMENT

Figure 1:
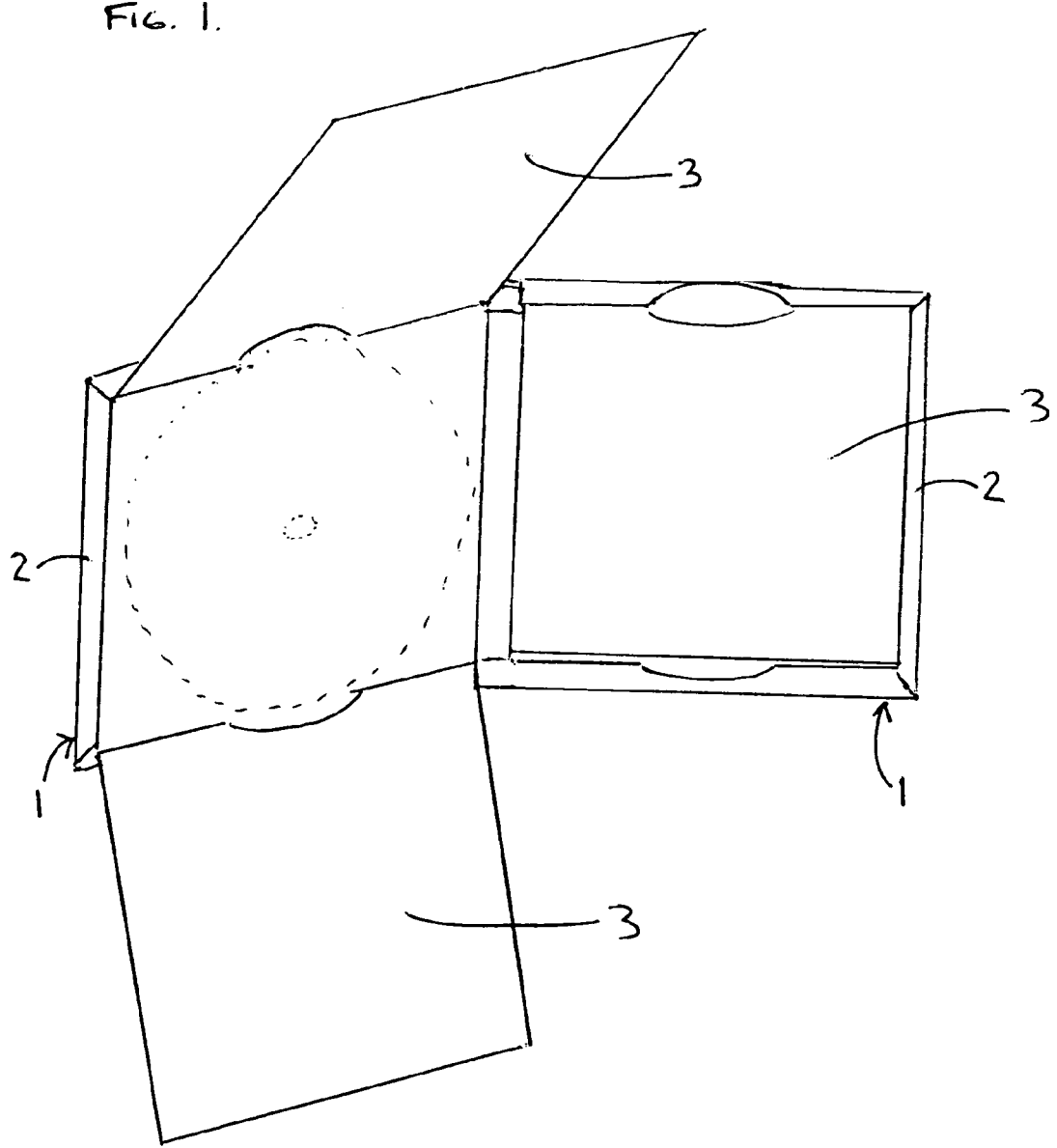
FIG. 1 is a perspective view of the invention, showing base sheets 1, a cover sheet 2 and a foldable panel sheet 3 as they would be combined to form the System. A CD is shown in dotted lines.
Figure 2:
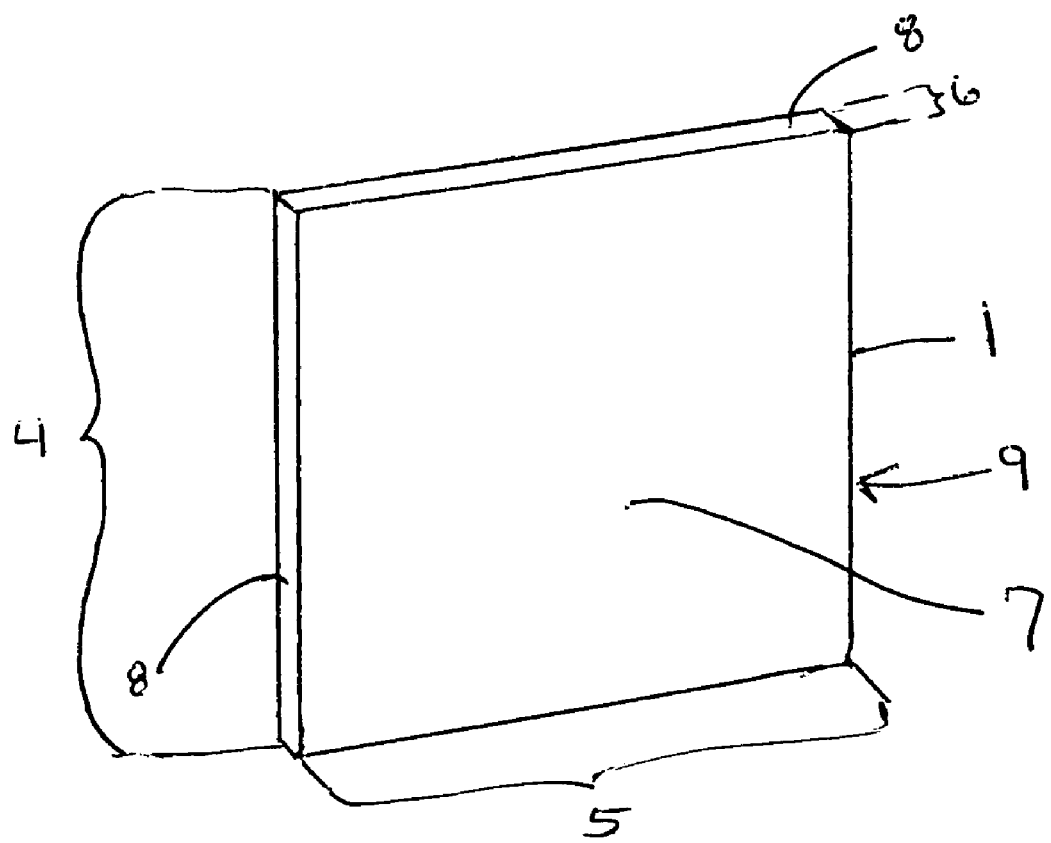
FIG. 2 shows the base sheet 1, indicating the base sheet height dimension 4, base sheet length dimension 5, base sheet thickness dimension 6, base sheet inner surface 7 and base sheet edge surface 8. Base sheet outer surface 9 is not shown from this view.
Figure 3:
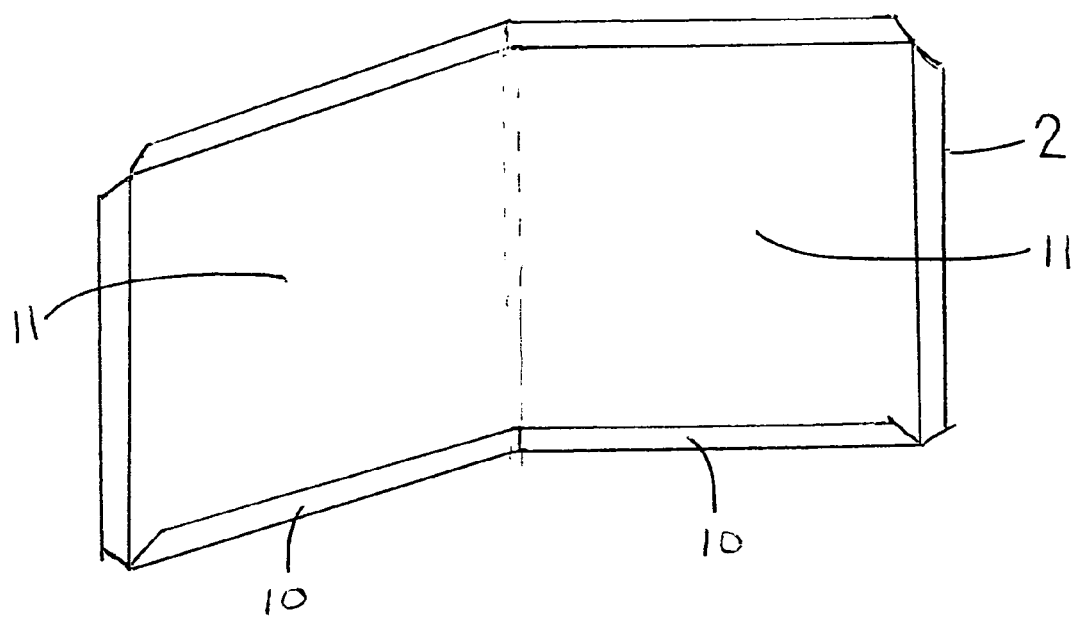
FIG. 3 shows the cover sheet 2, in a partially folded configuration, indicating cover sheet outer surface 10 and cover sheet inner surface 11.
Figure 4:
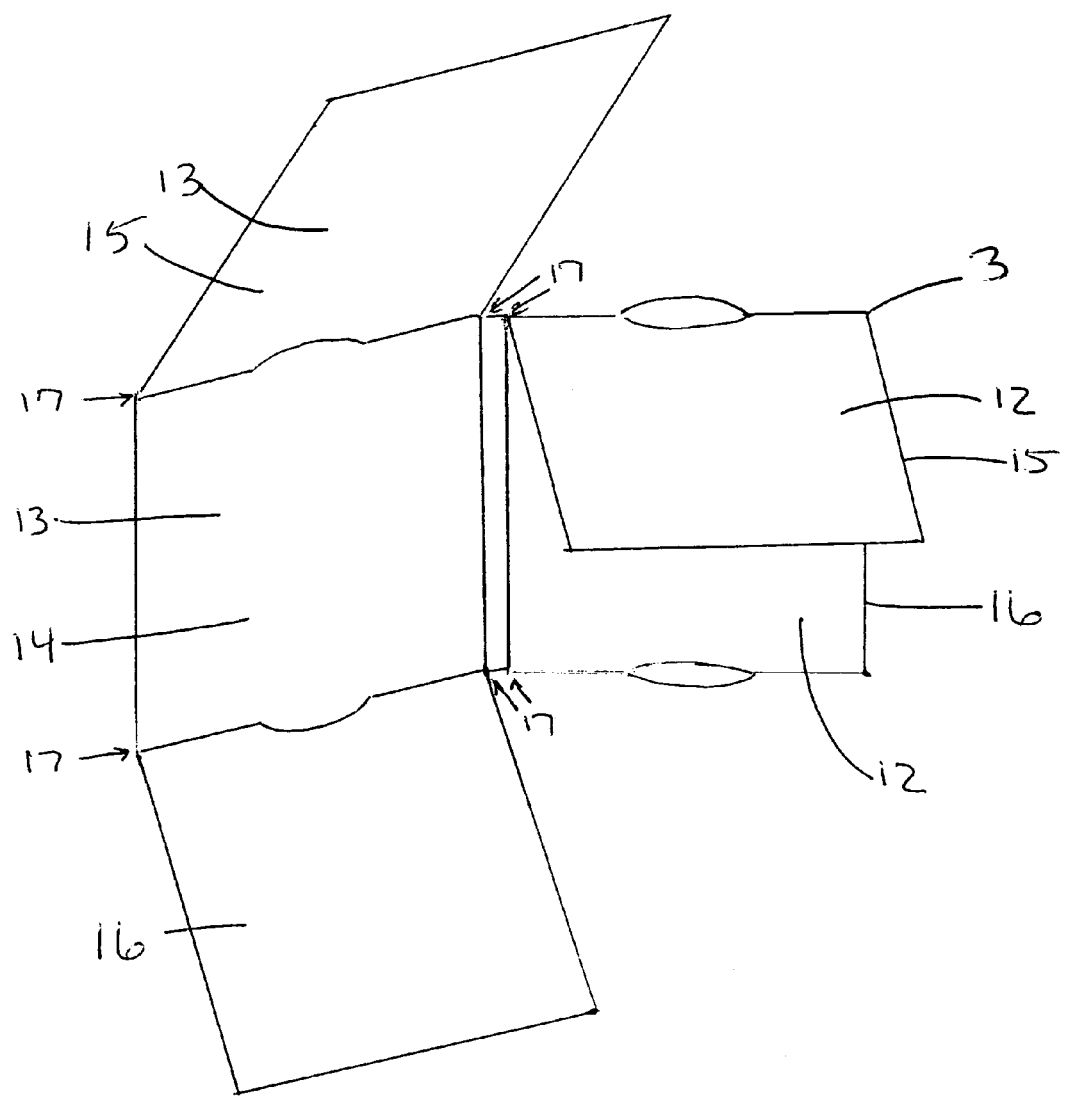
FIG. 4 shows the foldable panel sheet 3, in a partially folded configuration, indicating foldable panel sheet outer surface 12, foldable panel sheet inner surface 13, foldable panel sheet center section 14, foldable panel sheet top end 15 and foldable panel sheet bottom end 16. Also shown are fold lines 17.

The invention is a new and improved CD Holder, Protector and Information System system as shown in FIG. 1 where the present invention is shown. The system incorporates at least one base sheet 1, at least one cover sheet 2 and at least one foldable sheet 3.

The base sheet or sheets 1 would be of material that is difficult to bend such as pasteboard. The base sheets would be rectangular in shape having a height dimension, a length dimension and a thickness dimension. The base sheet height dimension would be greater than the diameter of the CD. The base sheet length dimension would be greater than the base sheet height dimension. Further the base sheet would have an outer surface, an inner surface and an edge surface.

The cover sheet or sheets 2 would be of a material that is of a thickness that permits easy folding. The cover sheets would be used as a partial wrapper around the base sheet pasteboard. The cover sheets would have an outer surface and an inner surface. The cover sheets would be sized and shaped, when folded, in order to completely wrap the base sheets 1 outer surface and base sheets edge surface and extend partially wrapping the base sheets inner surface. The cover sheets outer surface would be exposed when wrapped around the base sheets. The cover sheets would have information or drawings on the outer surface.

The foldable panel sheet or sheets 3 would of material with a thickness that retains its shape and yet is easily folded if scored or creased at the desired fold line. The foldable panel sheets would have an outer surface, an inner surface, a center section, a top end and a bottom end. The top end and bottom end would cover the inner surface when folded. The foldable panel sheets would have information, text, drawings designs or other information printed on both the outer and inner surfaces of the top end and the bottom end, and in addition on the inner surface of the center section. The foldable panel sheets would be sized and shaped to have a width, that is less than but, nearly equal to the base sheets length and an unfolded length equal to at least twice but less than three times the base sheet height. The foldable panel sheets would have two fold lines running widthwise, one fold line being the fold line toward the top end of the foldable panel sheet and one fold line being the fold line toward the bottom end of the foldable panel sheet. The two fold lines would be spaced apart a distance that is less than the diameter of the CD. Further the foldable panel sheets would be cut with two partial arcs, one at the fold line toward the top end of the foldable panel sheet and one at the fold line toward the bottom end of the foldable panel sheet, said arcs starting and ending at the respective fold lines, with the radius of the arc being the same as the radius of the CD. With the result being that when the foldable panel sheet is folded at the two fold lines the partial arcs protrude above the respective folds. When a CD is placed upon the foldable panel prior to folding the CD is positioned with the recorded side facing downward and also to have the CDs edge match with the two partial arcs. The foldable panel sheet is then folded and the CD is held and protected.

From the foregoing description it will be apparent that modifications can be made to the apparatus without departing from the teaching of the present invention. Accordingly, it is distinctly understood that the invention is not limited to the preferred embodiment but may be embodied and practiced within the scope of the following claims.

I claim the following:

1. A CD HOLDER, PROTECTOR AND INFORMATION SYSTEM for use with a CD said CD being a flat circular disk having a diameter comprising:

a.) a plurality of base sheets, being from the group of materials that are difficult to bend that includes pasteboard, said base sheets each being rectangular in shape and having a base sheet height dimension, a base sheet length dimension and a base sheet thickness dimension, the base sheet height dimension being greater than the CD diameter, said base sheet length dimension being greater than the base sheet height dimension, each base sheet also having a base sheet outer surface, base sheet inner surface and a base sheet edge surface;

b.) a plurality of cover sheets, being from the group of materials that may be easily folded that includes paper, said cover sheets each having a cover sheet outer surface and a cover sheet inner surface, said covers sheets being sized and shaped when folded to have the cover sheet inner surface in contact with the base sheet outer surface, and further when folded the cover sheet completely covers the base sheet outer surface and base sheet edge surface forming cover sheet ends, in addition when folded further the cover sheet ends partially cover the base sheet inner surface, the cover sheet inner surface coated with an adhesive to fixedly secure the cover sheet to the base sheet; and c.) a plurality of foldable panel sheets, being from the group of materials that have a thickness such that the material retains its' shape and rigidity and if scored or creased may be folded at the score or crease, said foldable panel sheets each having a foldable panel sheet outer surface, foldable panel sheet inner surface, foldable panel sheet center section, foldable panel sheet top end and foldable panel sheet bottom end, the foldable panel sheet top end and foldable panel sheet bottom end are sized and shaped to cover the foldable panel sheet center section of the foldable panel sheet inner surface when folded, the foldable panel sheets sized and shaped to have a width dimension, that is less than but, nearly equal to the base sheets length dimension, and an unfolded length dimension equal to at least twice but less than three times the base sheet height dimension, the foldable panel sheets have two fold lines running widthwise, one fold line being a fold line toward the top end of the foldable panel sheet and one fold line being the fold line toward the bottom end of the foldable panel sheet, the two fold lines spaced apart a distance that is less than the diameter of the CD, the foldable panel sheets cut with two partial arcs, one at the fold line toward the top end of the foldable panel sheet and one at the fold line toward the bottom end of the foldable panel sheet, said arcs starting and ending at the respective fold lines, with the diameter of the resulting partial arcs being the same as the diameter of the CD, the outer surface of the foldable panel sheet center section being coated with adhesive to fixedly secure the foldable panel sheet center section outer surface to the outer surface of the cover sheet ends that are exposed after said cover sheet is folded over the base sheet.

2. A CD HOLDER, PROTECTOR AND INFORMATION SYSTEM for use with a CD said CD being a flat circular disk having a diameter comprising:

a.) a plurality of base sheets, being from the group of materials that are difficult to bend that includes pasteboard, said base sheets each being rectangular in shape and having a base sheet height dimension, a base sheet length dimension and a base sheet thickness dimension, the base sheet height dimension being greater than the CD diameter, said base sheet length dimension being greater than the base sheet height dimension, each base sheet also having a base sheet outer surface, base sheet inner surface and a base sheet edge surface;

b.) a plurality of cover sheets, being from the group of materials that may be easily folded that includes paper, said cover sheets each having a cover sheet outer surface and a cover sheet inner surface, said covers sheets being sized and shaped when folded to have the cover sheet inner surface in contact with the base sheet outer surface, and further when folded the cover sheet completely covers the base sheet outer surface and base sheet edge surface forming cover sheet ends, in addition when folded further the cover sheet ends partially cover the base sheet inner surface, the cover sheet inner surface coated with an adhesive to fixedly secure the cover sheet to the base sheet, the outer surface of the cover sheet except the cover sheet ends portions having information printed thereon; and c.) a plurality of foldable panel sheets, being from the group of materials that have a thickness such that the material retains its' shape and rigidity and if scored or creased may be folded at the score or crease, said foldable panel sheets each having a foldable panel sheet outer surface, foldable panel sheet inner surface, foldable panel sheet center section, foldable panel sheet top end and foldable panel sheet bottom end, the foldable panel sheet top end and foldable panel sheet bottom end are sized and shaped to cover the foldable panel sheet center section of the foldable panel sheet inner surface when folded, the foldable panel sheets sized and shaped to have a width dimension, that is less than but, nearly equal to the base sheets length dimension, and an unfolded length dimension equal to at least twice but less than three times the base sheet height dimension, the foldable panel sheets have two fold lines running widthwise, one fold line being a fold line toward the top end of the foldable panel sheet and one fold line being the fold line toward the bottom end of the foldable panel sheet, the two fold lines spaced apart a distance that is less than the diameter of the CD, the foldable panel sheets cut with two partial arcs, one at the fold line toward the top end of the foldable panel sheet and one at the fold line toward the bottom end of the foldable panel sheet, said arcs starting and ending at the respective fold lines, with the diameter of the resulting partial arcs being the same as the diameter of the CD, the outer surface of the foldable panel sheet center section being coated with adhesive to fixedly secure the foldable panel sheet center section outer surface to the outer surface of the cover sheet ends that are exposed after said cover sheet is folded over the base sheet, the foldable panel sheets would have information printed on both the outer and inner surfaces of the foldable panel sheet top end and the foldable panel sheet bottom end and in addition on the center section of the foldable panel sheet inner surface.

* * * * *